US011182851B2

(12) United States Patent
Derbakova et al.

(10) Patent No.: US 11,182,851 B2
(45) Date of Patent: Nov. 23, 2021

(54) INTER-LEDGER MESSAGING IN A BLOCKCHAIN

(71) Applicant: International Business Machines Corporation, Armonk, NY (US)

(72) Inventors: Anna D. Derbakova, Durham, NC (US); Nitin Gaur, Austin, TX (US); Praveen Jayachandran, Bangalore (IN); Srinivasan Muralidharan, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 15/298,906

(22) Filed: Oct. 20, 2016

(65) Prior Publication Data

US 2018/0113752 A1    Apr. 26, 2018

(51) Int. Cl.
*G06Q 40/02*    (2012.01)

(52) U.S. Cl.
CPC ..... *G06Q 40/025* (2013.01); *G06F 2209/547* (2013.01); *H04L 2209/38* (2013.01)

(58) Field of Classification Search
CPC ............... G06Q 20/367; G06Q 40/025; G06F 2209/547; H04L 2209/38
USPC ........................................................ 705/50
See application file for complete search history.

(56) References Cited

U.S. PATENT DOCUMENTS

| | | | |
|---|---|---|---|
| 9,544,284 B1* | 1/2017 | Dooley et al. | |
| 10,068,228 B1* | 9/2018 | Winklevoss et al. | |
| 10,521,780 B1* | 12/2019 | Hopkins et al. | |
| 2015/0228004 A1 | 8/2015 | Bednarek et al. | |
| 2015/0244690 A1 | 8/2015 | Mossbarger | |
| 2015/0379510 A1 | 12/2015 | Smith | |
| 2016/0261404 A1 | 9/2016 | Ford et al. | |
| 2016/0321115 A1* | 11/2016 | Thorpe et al. | |
| 2016/0330034 A1* | 11/2016 | Back et al. | |
| 2017/0046693 A1* | 2/2017 | Haldenby et al. | |
| 2017/0230189 A1* | 8/2017 | Toll et al. | |
| 2017/0300875 A1* | 10/2017 | GilBoa et al. | |
| 2017/0308872 A1* | 10/2017 | Uhr et al. | |
| 2017/0337534 A1* | 11/2017 | Goeringer et al. | |
| 2018/0006807 A1* | 1/2018 | Suresh et al. | |
| 2018/0068130 A1* | 3/2018 | Chan et al. | |
| 2018/0109541 A1* | 4/2018 | Gleichauf | |
| 2018/0225611 A1* | 8/2018 | Daniel et al. | |
| 2018/0293573 A1* | 10/2018 | Ortiz et al. | |

OTHER PUBLICATIONS

Proof of Bitcoin Node (Year: 2015).*
Bitcoin Mining Decentralization via Cost Analysis (Year: 2016).*

* cited by examiner

*Primary Examiner* — James D Nigh
*Assistant Examiner* — Yin Y Choi

(57) ABSTRACT

Operating conditions of a blockchain configuration may be dynamic and change automatically under certain circumstances. One example method of operation may include receiving a blockchain transaction sent from a first blockchain to a second blockchain, identifying an inter-ledger contract between the first blockchain and the second blockchain, receiving an inter-ledger message at the second blockchain from the first blockchain, and determining whether to log the blockchain transaction in the first blockchain or the second blockchain based on the inter-ledger message.

20 Claims, 6 Drawing Sheets

300

350

INTER-LEDGER MESSAGING IN A BLOCKCHAIN

TECHNICAL FIELD

This application relates to integration in blockchain consensus models and more specifically to using inter-ledger messaging in a blockchain.

BACKGROUND

In a blockchain configuration, there are varying consensus algorithms that can be used. For example, many public blockchains utilize a Proof of Work (PoW) as their initial consensus algorithm, but may later switch to Proof of Stake (PoS) as the value of their underlying crypto-currency increases. Another example is a private blockchain that chooses an algorithm such as Practical Byzantine Fault Tolerance (pBFT), which may work well for small networks with less than 100 nodes, but present scalability challenges as the number of nodes expand. This change usually means re-architecting an application, a redesign of blockchain infrastructure, re-provisioning of a new infrastructure and/or migration of a validated transaction chain or blockchain. All such changes can be expensive and even unachievable.

Current blockchain configurations are utilized for singular business activities, such as payments, mortgages, securities, etc. However, those activities are seldom performed alone and are commonly linked to other business activities. For example, a payment made towards an asset such as a mortgage, car, debt, financial instrument, etc., is normally expected to be received and processed on its own transaction chain to preserve homogeneity of the transaction and asset types. This type of cross-platform configuration imposes a technical interoperability challenge between various business functions mainly due to varying consensus models/systems applied to different blockchains managed by different entities.

SUMMARY

One example embodiment may include a method that comprises at least one of receiving a blockchain transaction at a first blockchain operated by a first device, where the blockchain transaction is sent from a second blockchain operated by a second device, establishing an inter-ledger contract between the first blockchain and the second blockchain, receiving an inter-ledger message at the first device from the second device, and identifying one or more consensus procedures accepted by the first blockchain and the second blockchain to be used for the blockchain transaction.

Another example embodiment may include a method that comprises at least one of receiving a blockchain transaction sent from a first blockchain to a second blockchain, identifying an inter-ledger contract between the first blockchain and the second blockchain, receiving an inter-ledger message at the second blockchain from the first blockchain and determining whether to log the blockchain transaction in the first blockchain or the second blockchain based on the inter-ledger message.

Another example embodiment may include an apparatus that comprises a receiver configured to perform at least one of receive a blockchain transaction sent from a first blockchain to a second blockchain, and a processor configured to identify an inter-ledger contract between the first blockchain and the second blockchain, receive an inter-ledger message at the second blockchain from the first blockchain, and determine whether to log the blockchain transaction in the first blockchain or the second blockchain based on the inter-ledger message information.

Another example embodiment may include a non-transitory computer readable storage medium configured to store instructions that when executed causes a processor to perform at least one of receiving a blockchain transaction sent from a first blockchain to a second blockchain, identifying an inter-ledger contract between the first blockchain and the second blockchain, receiving an inter-ledger message at the second blockchain from the first blockchain, and determining whether to log the blockchain transaction in the first blockchain or the second blockchain based on the inter-ledger message information.

DETAILED DESCRIPTION

Figure 1A:
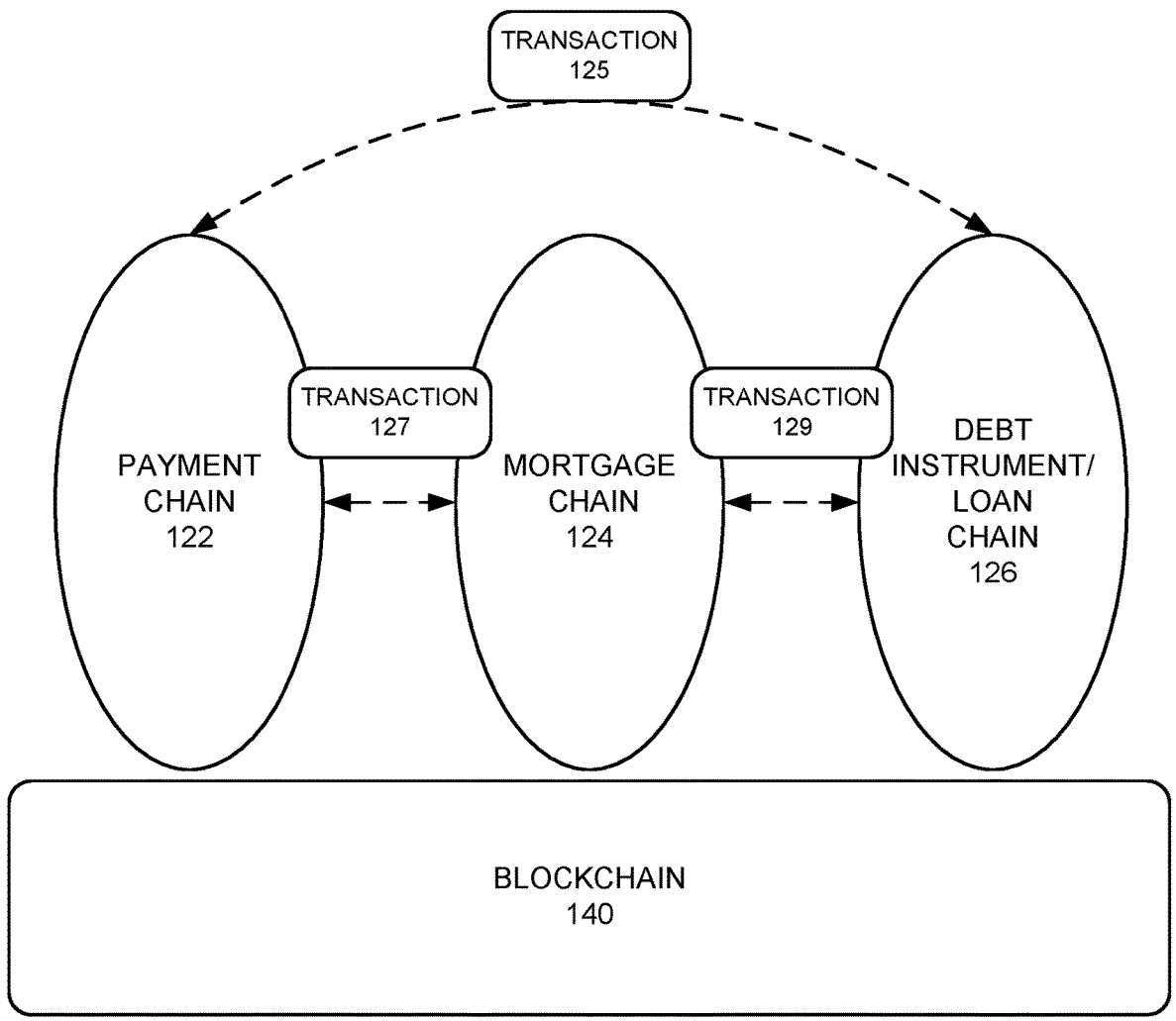
FIG. 1A illustrates a logic block diagram of a blockchain inter-ledger messaging configuration according to example embodiments.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide a method, apparatus, an application and/or software procedure which enables inter-ledger messaging within a blockchain context. Such inter-ledger messaging in a blockchain provides adaptability between different blockchain configurations. The configuration is setup to preserve the transactional integrity of each independent blockchain and ensure that data elements required to be shared among the blockchains are delivered using a specific inter-ledger communication system. This configuration permits for the consensus/trust system to operate independently and use validators to validate the completeness of data prior to committing the resources needed from the consensus systems. Example embodiments provide a method and apparatus to enable inter-ledger messaging delivery, while preserving the transaction system of each independent blockchain.

In general, the blockchain and corresponding cryptography relate to a decentralized consensus. Conventional approaches would often utilize a centralized consensus (i.e., when one central database was used to rule transaction validity). A decentralized approach transfers authority and trusts to a decentralized network and enables nodes to continuously and sequentially record their transactions on a public "block," creating a unique "chain", such as the blockchain. Cryptography may be performed via hash codes and may be used to secure the authentication of the transaction source and remove the need for a central intermediary. The combination of cryptography and blockchain technology together ensure there should not be a duplicate recording of the same transaction.

Some possibilities for blockchain management may include multiple users or companies operating applications on the blockchain, and those applications can interact with each other at an extremely high speed without requiring any network messages, while at the same time ensuring that each company has total control over its own application(s). Example embodiments provide a cross-ledger messaging blockchain context which preserves the transactional integrity of each independent blockchain system and ensures that data elements needed are delivered using a cross-ledger system, which will be required for input into transactional activity of another business activity. This will permit for the consensus/trust system to operate independently and use validators to validate the completeness of data prior to committing the resources needed from the consensus systems.

FIG. 1A illustrates a logic block diagram of a blockchain inter-ledger messaging configuration according to example embodiments. Referring to FIG. 1A, the logic diagram 100 includes a blockchain 140 which has multiple separate chains or local blockchains belonging to different entities, such as banks, service companies, product companies, etc. In this example, a payment chain 122 may undergo a transaction 125 to a loan company chain 126. The transaction may be conducted with a series of transaction or micro-transactions 127 and 129 which are conducted directly from chain to chain (via 122-124-126) as part of an inter-ledger communication model. The blockchain 140 provides a platform for a shared ledger, block models, and cryptography, ensuring secure, authenticated and verifiable transactions. The inter-ledger messaging may be used to form a blockchain trust module, which may be represented as a trust layer that will include various modules representing the validation systems, such as a consensus model (i.e., Practical Byzantine Fault Tolerance (PBFT), Byzantine Fault Tolerance (BFT), Greedy Heaviest Observed Subtree (GHOST), RAFT algorithm, etc.) and even custom models, such as a partitioned consensus, and a combination of concepts included in PBFT and RAFT among other models.

Figure 1B:
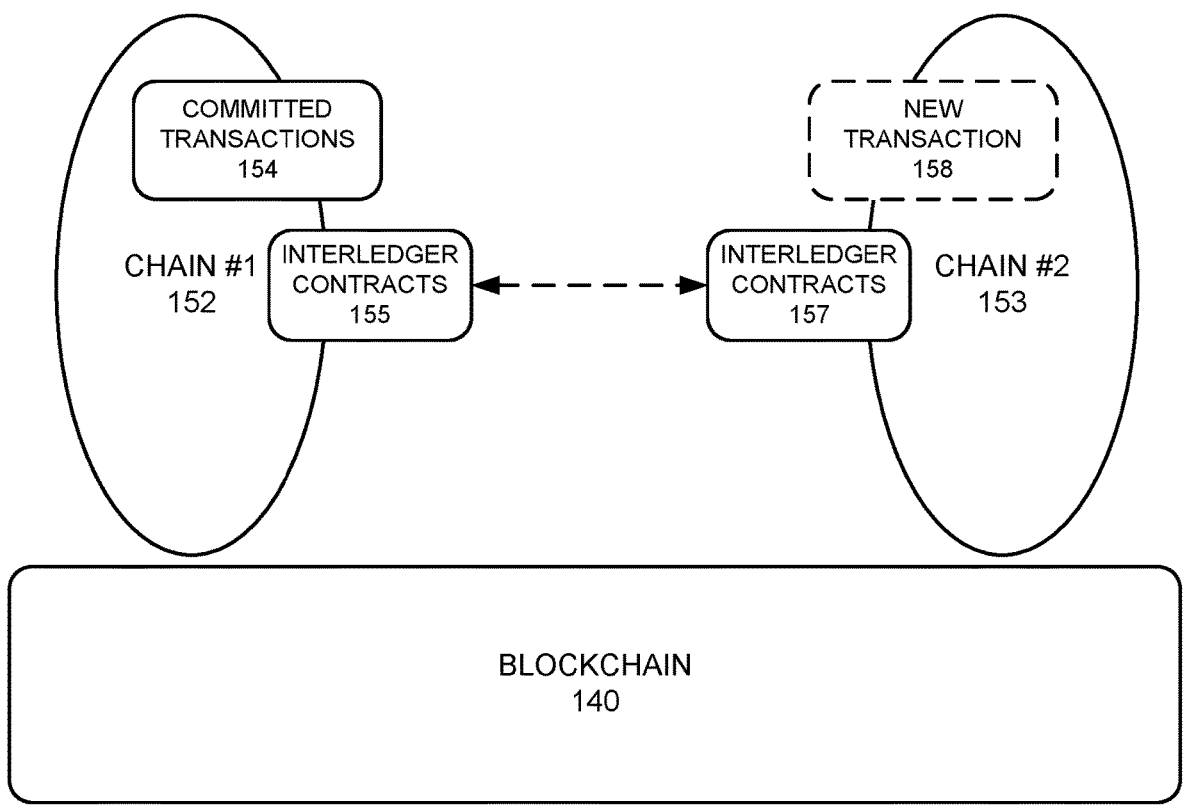
FIG. 1B illustrates a detailed logic block diagram of the inter-ledger configuration establishing contracts according to example embodiments.

FIG. 1B illustrates a detailed logic block diagram of the inter-ledger linker configuration establishing contracts according to example embodiments. Referring to FIG. 1B, the detailed diagram 150 illustrates inter-ledger contracts 155 and 157 being setup and shared between the separate chains 152 and 153. The contracts between related or adjacent business ledgers define the business relationship between one or more ledgers. The contracts include information and requirements which ensure the appropriate data is extracted and shared from the committed transactions. Examples of consensus procedures could be one or more of PBFT, Proof-of-Work (PoW), RAFT, GHOST, and Proof-of Stake (PoS) and the inter-ledger contracts would specify one or more of PBFT, POW, RAFT, GHOST, and POS. An inter-ledger linker may include components, such as messaging middleware, event infrastructure, and listeners to ensure that the validators execute the data extraction from committed transactions and place it on an appropriate queue. The data extraction should only occur on committed transactions 154 which does not interfere with processing or pending (new) transactions 158. The inter-ledger linker will have the capability to execute smart contracts and place data in queue as defined by the inter-ledger contracts.

One example set of operations may include creating individual chains and consensus model devices that permit business applications to interface and create transactions and blocks. In the example of FIG. 1B, in chain #1, 152, assuming a payment chain receives a block with payment transactions, a financial institution such as a bank may receive payment with information, such as name, account, amount, annotation and payment account (e.g., payoff, car, loan, house, etc.). The payment transaction block will be processed and the transaction will be committed 154 by using, for example, a variant-BFT consensus. The inter-ledger contract examines all committed transactions, recently committed transactions, or a combination of the two, and evaluates business relationship data for data extraction. The data elements for Know Your Customer/Anti Money Laundering (KYC/AML) requirements, etc., can be extracted and provided to the inter-ledger linker, which performs a ledger sort, queue and trusted connectivity function along with delivery to other adjacent business ledgers/blockchains. The extracted ledger is securely delivered via a network to the target chains, where data receipts trigger transaction initialization leading to block formation to be processed and committed by the consensus system of the business chain. Once the transaction is committed, this process repeats to other adjacent and linked chains.

According to example embodiments, blockchain transactions in the enterprise environment may include multiple chains as illustrated in FIGS. 1A and 1B. For instance, in FIG. 1A, a payment chain 122 may receive an initial payment from an end user device, for example, another banking institution, etc. The payment transaction may be parsed by the payment chain 122 as the receiving chain and the payment may include but is not limited to a monetary amount, account number, user identification information, transmitting banking information, etc. The mortgage chain 124 may be the intended destination chain as indicated by the transaction information parsed from the initial receipt. The loan chain 126 may be part of the mortgage payment as the principal, interest, escrow funds, etc. may be sorted and stored as part of a debt instrument ledger, and the mortgage payment calculation and mortgage entity may be updated to store the transaction in the mortgage chain. The inter-ledger messaging may create micro-transactions 127 and 129, which include the parsed information from the initial transaction 125. For example, if the account number is identified to be part of the mortgage department, then the transaction will ultimately be written to the mortgage chain 124, however, inter-ledger messages are created and sent to all chains which are a party to the recent payment.

Referring again to FIG. 1B, the inter-ledger contracts 155 and 157 represent the smart contracts operating on the chain code to define the requirements and information necessary to organize the transactions. For example, the mortgage chain may have an inter-ledger contract which requires certain account numbers to be present in the transaction information in order to store the information in the mortgage chain. Also, the format of the data, routing numbers, account numbers, all the necessary actions and requirements may be stored in the inter-ledger contracts. The direct inter-ledger messaging will not require large data messages to be transmitted among the various chains. Also, broadcasting of transaction information is generally not appropriate since the result would include large amounts of congestion and bandwidth overutilization.

Figure 2:
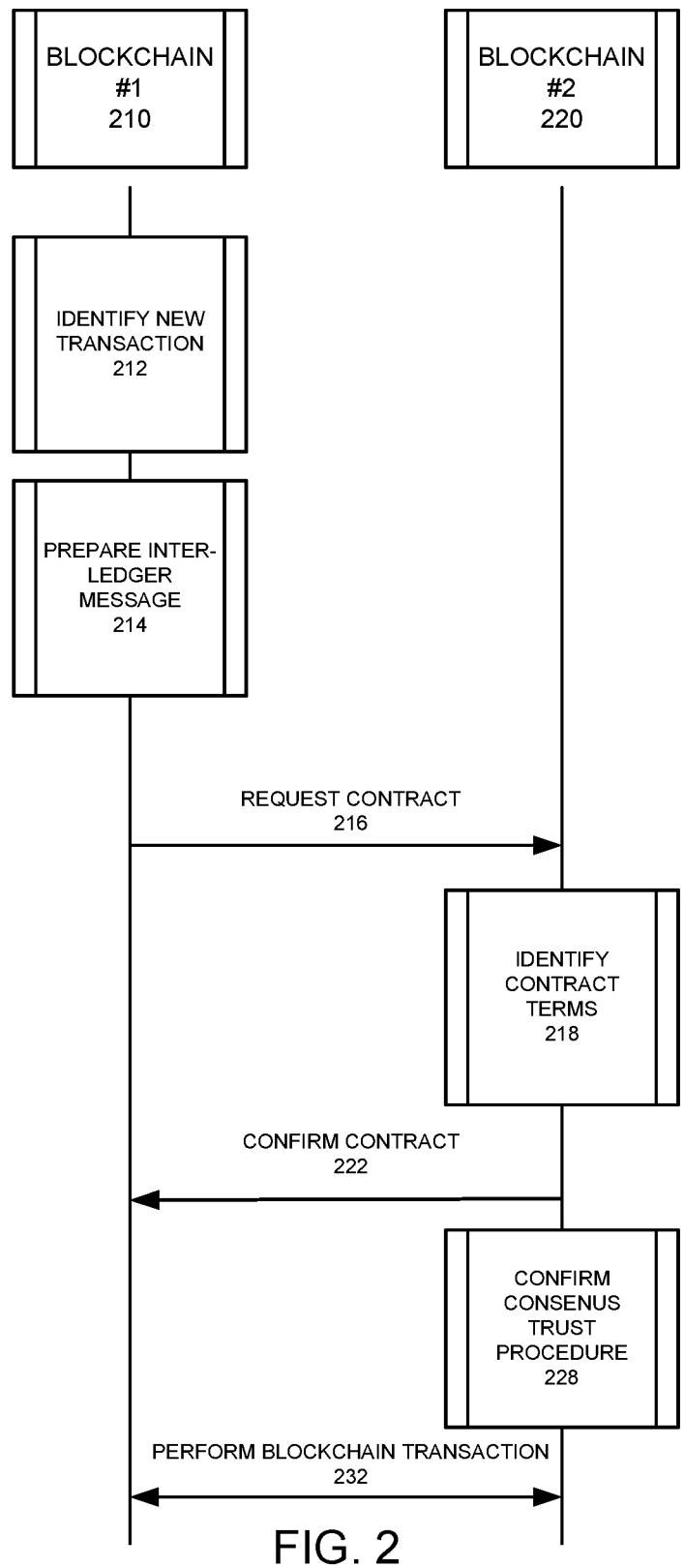
FIG. 2 illustrates a system signaling diagram of the inter-ledger communication between separate blockchains according to example embodiments.

FIG. 2 illustrates a system signaling diagram of the inter-ledger communication between separate blockchains according to example embodiments. Referring to FIG. 2, the system 200 includes two separate blockchains 210 and 220 communicating together to share inter-ledger support for transactions. In one example of operation, a new transaction 212 may cause an inter-ledger message scheme 214 to communicate between blockchain entities. For example, a request may be sent 216 to establish a contract term or confirm contract terms which are known by both chains. The terms can be identified 218 and confirmed 222 and a consensus trust procedure may be identified 228 and used to process the ledger 232.

Figure 3A:
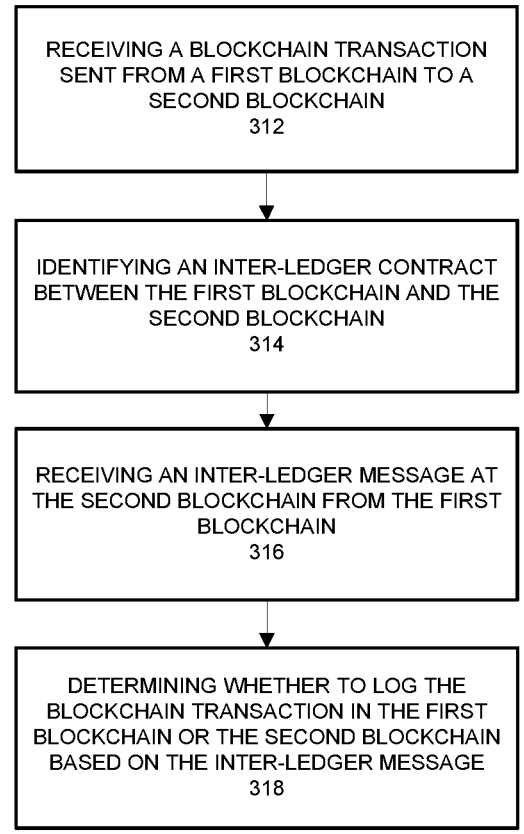
FIG. 3A illustrates a flow diagram of an example method of operation according to example embodiments.

FIG. 3A illustrates a flow diagram of an example method of operation according to example embodiments. Referring to FIG. 3A, the method 300 may include one or more of receiving a blockchain transaction sent from a first blockchain to a second blockchain 312, identifying an inter-ledger contract between the first blockchain and the second blockchain 314, receiving an inter-ledger message at the second blockchain from the first blockchain 316, and determining whether to log the blockchain transaction in the first blockchain or the second blockchain based on the inter-ledger message 318.

Figure 3B:
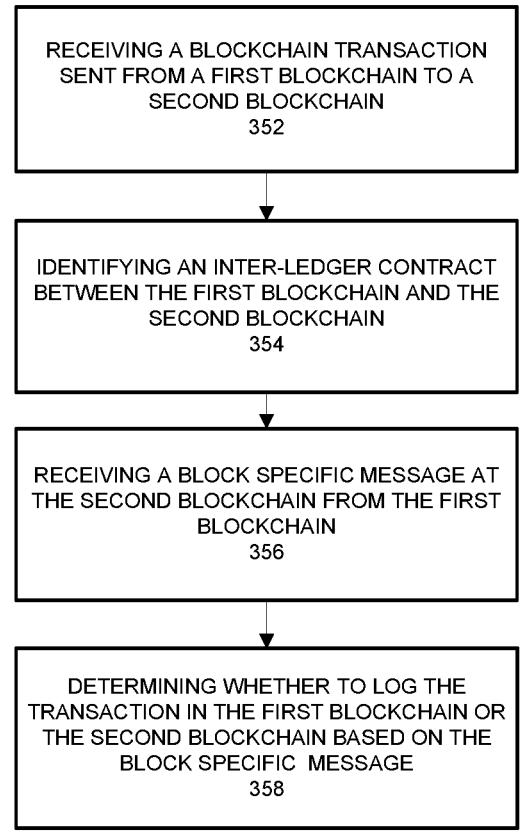
FIG. 3B illustrates another flow diagram of another example method of operation according to example embodiments.

FIG. 3B illustrates a flow diagram of an example method of operation according to example embodiments. Referring to FIG. 3B, the method 350 may include one or more of receiving a blockchain transaction sent from a first blockchain to a second blockchain at operation 352, identifying an inter-ledger contract between the first blockchain and the second blockchain 354, receiving a block specific message at the second blockchain from the first blockchain 356, and determining whether to log the transaction in the first blockchain or the second blockchain based on the block specific message 358. The procedure may include using messages either stored or sent from one block in one of the blockchains to another to verify a transaction. The blocks may have messages which identify another blockchain, a specific transaction, parties to the transaction or other transaction specific information. The inter-ledger messages and contracts may be verified with one or more messages stored in the blocks. The message may be a favorable message or an unfavorable message that indicates whether the transaction is sent or received in the correct blockchain and whether the transaction should be written to a specific block or blockchain.

Additionally, a current consensus procedure of the first blockchain may be different from a current consensus procedure of the second blockchain. The inter-ledger messaging may assist with communicating between the various blockchains without requiring a common consensus procedure. Other examples may include establishing a ledger share agreement between the first blockchain and the second blockchain, and transmitting an inter-ledger confirmation message confirming the ledger share agreement. The ledger share agreement may include any of a block model, a cryptography type, a verification procedure, and a consensus procedure. The method may also provide parsing the blockchain transaction at the first blockchain to retrieve identifiers, metadata, transaction information, etc., and identifying one or more identifiers associated with the second blockchain or a third or other blockchain. The method may also provide determining to log the transaction in the second blockchain based on the one or more identifiers, and logging the transaction in the second blockchain. The method may also include identifying one or more consensus procedures accepted by the first blockchain and the second blockchain to be used for the blockchain transaction, and identifying a third blockchain referenced by the inter-ledger message, and transmitting another inter-ledger message to the third blockchain to log a portion of the blockchain transaction in the third blockchain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
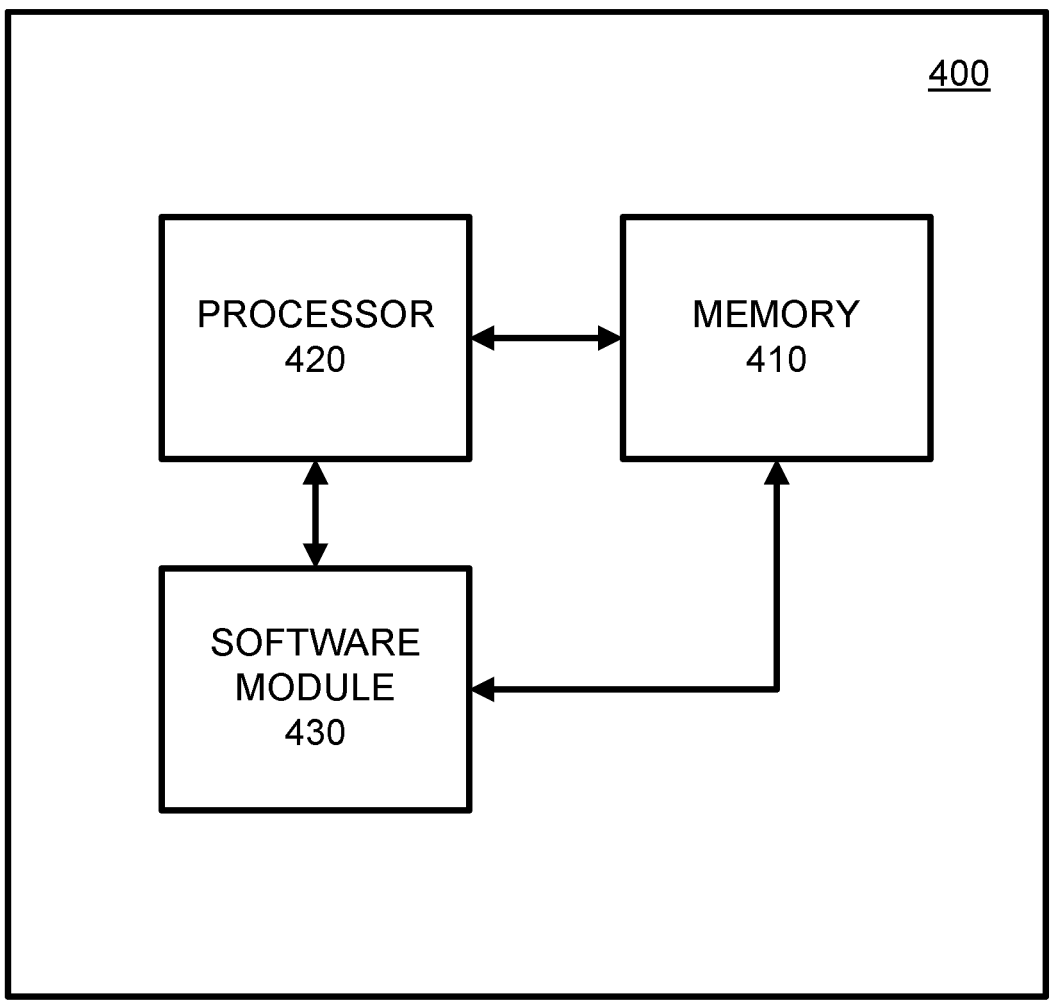
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computer-implemented method, comprising:
   receiving, by a computing system of a first blockchain, a blockchain transaction;
   identifying, by the computing system, a data value managed by a second blockchain included in the received blockchain transaction;
   transmitting, via an inter-ledger smart contract, an inter-ledger message including data from the blockchain transaction from the computing system of the first blockchain to a computing system of the second blockchain;
   determining, by the computing system, to log the blockchain transaction in the first blockchain; and
   logging the blockchain transaction in the first blockchain.

2. The computer-implemented method of claim 1, wherein a current consensus procedure of the first blockchain is different from a current consensus procedure of the second blockchain.

3. The computer-implemented method of claim 1, further comprising:
   establishing a ledger share agreement, by the computing system, between the first blockchain and the second blockchain; and
   transmitting an inter-ledger confirmation message confirming the ledger share agreement, by the computing system.

4. The computer-implemented method of claim 3, wherein the ledger share agreement comprises one or more of a block model, a cryptography type, a verification procedure, and a consensus procedure.

5. The computer-implemented method of claim 1, further comprising:
   parsing the blockchain transaction at the first blockchain, by the computing system;
   identifying one or more identifiers associated with the second blockchain, by the computing system; and determining to log the transaction in the second blockchain based on the one or more identifiers.

6. The computer-implemented method of claim 1, further comprising:
identifying, by the computing system, one or more consensus procedures accepted by the first blockchain and the second blockchain to be used for the blockchain transaction.

7. The computer-implemented method of claim 5, further comprising:
identifying a third blockchain referenced by the blockchain transaction, by the computing system; and
transmitting, via the inter-ledger smart contract, another inter-ledger message to a computing system of the third blockchain to log a portion of the blockchain transaction in the third blockchain.

8. An apparatus, comprising:
a processor configured to:
receive a blockchain transaction via a computing system of a first blockchain,
identify a data value managed by a second blockchain included in the received blockchain transaction,
transmit, via an inter-ledger smart contract, an inter-ledger message including data from the blockchain transaction from the computing system of the first blockchain to a computing system of the second blockchain,
determine whether to log the blockchain transaction in the first blockchain, and
log the blockchain transaction in the first blockchain.

9. The apparatus of claim 8, wherein a current consensus procedure of the first blockchain is different from a current consensus procedure of the second blockchain.

10. The apparatus of claim 8, wherein the processor is further configured to:
establish a ledger share agreement between the first blockchain and the second blockchain, and
transmit an inter-ledger confirmation message confirming the ledger share agreement.

11. The apparatus of claim 10, wherein the ledger share agreement comprises one or more of a block model, a cryptography type, a verification procedure, and a consensus procedure.

12. The apparatus of claim 8, wherein the processor is further configured to:
parse the blockchain transaction at the first blockchain,
identify one or more identifiers associated with the second blockchain, and
determine to log the transaction in the second blockchain based on the one or more identifiers.

13. The apparatus of claim 8, wherein the processor is further configured to:
identify one or more consensus procedures accepted by the first blockchain and the second blockchain to be used for the blockchain transaction.

14. The apparatus of claim 12, wherein the processor is further configured to:
identify a third blockchain referenced by the blockchain transaction, and
transmit, via the inter-ledger smart contract, another inter-ledger message to a computing system of the third blockchain to log a portion of the blockchain transaction in the third blockchain.

15. A non-transitory computer readable storage medium storing one or more instructions that when executed by a processor cause the processor to perform a method comprising:
receiving a blockchain transaction via a computing system of a first blockchain;
identifying a data value managed by a second blockchain within the blockchain transaction;
transmitting, via an inter-ledger smart contract, an inter-ledger message including data from the blockchain transaction from the computing system of the first blockchain to a computing system of the second blockchain;
determining to log the blockchain transaction in the first blockchain; and
logging the blockchain transaction in the first blockchain.

16. The non-transitory computer readable storage medium of claim 15, wherein a current consensus procedure of the first blockchain is different from a current consensus procedure of the second blockchain.

17. The non-transitory computer readable storage medium of claim 15, wherein the instructions are further configured to cause the processor to perform:
establishing a ledger share agreement between the first blockchain and the second blockchain; and
transmitting an inter-ledger confirmation message confirming the ledger share agreement.

18. The non-transitory computer readable storage medium of claim 17, wherein the ledger share agreement comprises one or more of a block model, a cryptography type, a verification procedure, and a consensus procedure.

19. The non-transitory computer readable storage medium of claim 15, wherein the instructions are further configured to cause the processor to perform:
parsing the blockchain transaction at the first blockchain;
identifying one or more identifiers associated with the second blockchain; and
determining to log the transaction in the second blockchain based on the one or more identifiers.

20. The non-transitory computer readable storage medium of claim 19, wherein the instructions are further configured to cause the processor to perform:
identifying a third blockchain referenced by the blockchain transaction; and
transmitting, via the inter-ledger smart contract, another inter-ledger message to a computing system of the third blockchain to log a portion of the blockchain transaction in the third blockchain.

* * * * *